(12) United States Patent
Wang et al.

(10) Patent No.: US 12,726,757 B2
(45) Date of Patent: Sep. 1, 2026

(54) SPEAKER BOX AND ELECTRONIC DEVICE

(71) Applicant: AAC Technologies (Nanjing) Co., Ltd., Nanjing (CN)

(72) Inventors: Zhongyang Wang, Nanjing (CN); Hezhi Wang, Nanjing (CN); Jie Zhang, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 243 days.

(21) Appl. No.: 18/399,768

(22) Filed: Dec. 29, 2023

(65) Prior Publication Data

US 2025/0106550 A1 Mar. 27, 2025

Related U.S. Application Data

(63) Continuation of application No. PCT/CN2023/122113, filed on Sep. 27, 2023.

(51) Int. Cl.
*H04R 1/28* (2006.01)
*C08J 9/42* (2006.01)

(52) U.S. Cl.
CPC ................ *H04R 1/288* (2013.01); *C08J 9/42* (2013.01); *C08J 2375/04* (2013.01); *C08J 2379/02* (2013.01)

(58) Field of Classification Search
CPC ............................ H04R 1/288; H04R 2499/11
See application file for complete search history.

(56) References Cited

U.S. PATENT DOCUMENTS

2019/0222920 A1* 7/2019 Harris .................. G06F 3/0488
2020/0029144 A1* 1/2020 Casati .................... H04R 1/083
2021/0037312 A1* 2/2021 Cho ....................... H04R 1/288

* cited by examiner

*Primary Examiner* — Kile O Blair
(74) *Attorney, Agent, or Firm* — Wiersch Law Group

(57) ABSTRACT

A speaker box and an electronic device are provided. The speaker box includes a housing, a speaker unit, and a sound-absorbing foam sheet. The housing includes an accommodating space. The speaker unit is accommodated in the accommodating space. The speaker unit is enclosed with the housing to define a rear cavity. The sound-absorbing foam sheet is adhered to an inner wall of the rear cavity. The sound-absorbing foam sheet includes a foam block and sound-absorbing powders adhered in the foam block. Through the sound-absorbing foam sheet, resonant frequency of the speaker box is effectively reduced, acoustic performance of the speaker box is improved, a structure of the speaker box is stable, and a preparation of the speaker box is simple.

9 Claims, 2 Drawing Sheets

SPEAKER BOX AND ELECTRONIC DEVICE

TECHNICAL FIELD

The present disclosure relates to a field of electroacoustic technology, and in particular to a speaker box and an electronic device.

BACKGROUND

As electronic devices are increasingly lighter and thinner, components in the electronic devices are thinner and thinner, leading to a smaller volume and a thinner thickness of a rear cavity in a speaker box assembly, an increase in speaker resonant frequency and a decrease in sensitivity, which affect an acoustic performance of the speaker.

In order to solve above problems, in the related art, sound absorption materials are filled in the rear cavity, which virtually increases the volume of the rear cavity, reduces the speaker resonant frequency, and improves the acoustic performance. The sound absorption materials are often made into particles, but in an actual application process, the granular made from the sound absorption materials are high in preparation cost, complex in process, etc. Moreover, since static electricity exists during assembly and filling of the particles, the rear cavity cannot be fully filled. Therefore, the particles may collide under a high-frequency vibration of sound waves, which further leads to failure risks such as falling of the particles and breakage of the particles.

In the related art, there is further a scheme that sound-absorbing powders are bonded into a sound-absorbing block through adhesive, but the sound-absorbing block is prone to colliding with an inner wall of the rear cavity, resulting in brittle fracture and cracking of the sound-absorbing block. Especially, when preparing the sound-absorbing block with a thickness of 0.2-1 mm, a fracture problem is more serious. Furthermore, when preparing the sound-absorbing block from the sound-absorbing powders, the sound-absorbing block is not firmly adhered through a double-sided adhesive tape, making the sound-absorbing block extremely easy to fall off, and being unable to be reinforced by the double-sided adhesive tape.

SUMMARY

The present disclosure aims to solve at least one of the technical problems in the prior art and provides a speaker box and an electronic device.

A first aspect of the present disclosure provides the speaker box including a housing, a speaker unit, and a sound-absorbing foam sheet. The housing defines an accommodating space. The speaker unit is accommodated in the accommodating space. The speaker unit is enclosed with the housing to define a rear cavity. The sound-absorbing foam sheet is adhered to an inner wall of the rear cavity.

The sound-absorbing foam sheet includes a foam block and sound-absorbing powders adhered in the foam block.

In one optional embodiment, the foam block is adhered to the inner wall of the rear cavity through an adhesive component.

In one optional embodiment, the foam block is an open-cell foam, and cells of the foam block is exposed in the rear cavity.

In one optional embodiment, a density of the foam block ranges from 10 mg/cm$^3$ to 100 mg/cm$^3$, and/or a thickness of the foam block ranges from 0.2-5 mm.

In one optional embodiment, the foam block is selected from one of melamine foam or polyurethane foam. The foam block contains more than 90% of cells with an aperture less than 0.5 mm.

In one optional embodiment, the adhesive component is a double-sided adhesive tape. A thickness of the double-sided adhesive tape ranges from 0.02-0.2 mm.

In one optional embodiment, the sound-absorbing powders and adhesives are blended to form a water-based emulsion. The foam block is impregnated with the water-based emulsion and dried, so that the sound-absorbing powders are connected to a surface of a support of the foam block.

In one optional embodiment, the adhesives are one or more of polyacrylate, styrene-butadiene emulsion, polystyrene acrylate, polystyrene acetate, polyurethane resin, and polyethylene vinyl acetate salt.

In one optional embodiment, the sound-absorbing powders are zeolite materials having one or more of an MFI structure, an MEL structure, and an FER structure of which a Si/M ratio is greater than 100 and a particle size is less than 10 μm.

The M includes one or more of Al, Fe, B, and Ga.

A second aspect of the present disclosure provides the electronic device, including the speaker box as previously described.

According to the speaker box and the electronic device provided by the embodiments of the present disclosure, the sound-absorbing foam sheet is adhered to the inner wall of the rear cavity, thus effectively reducing resonant frequency, improving acoustic performance, further improving performance stability of the speaker box during working, and preventing problems of falling off the sound-absorbing powders and breakage of the sound-absorbing block caused by collision between the sound-absorbing block and the inner wall of the rear cavity in the related art. The sound-absorbing powders are adhered in the foam block, the foam block adhered with the sound-absorbing powders is adhered to the double-sided adhesive tape, thus effectively solving a problem that the double-sided adhesive tape cannot firmly fix the sound-absorbing block.

DETAILED DESCRIPTION

In order to enable a person skilled in art to better understand technical solutions of embodiments of the present disclosure, the embodiments of the present disclosure are described in further details below in conjunction with accompanying drawings and specific embodiments.

Figure 1:
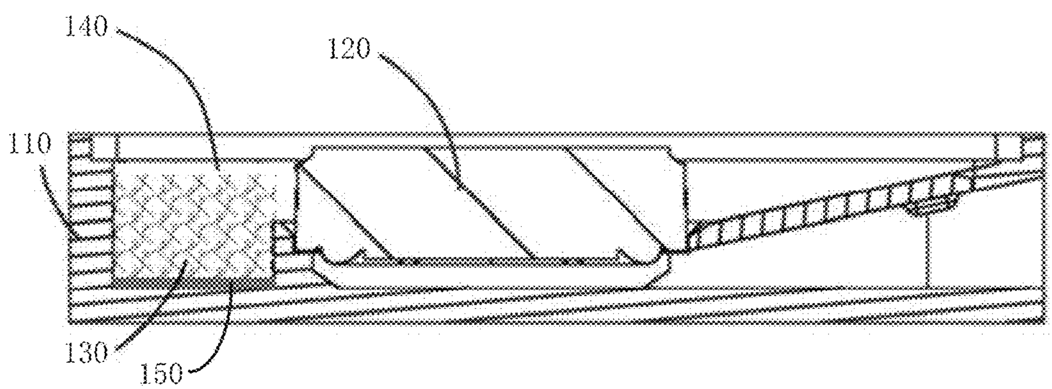
FIG. 1 is a structural schematic diagram of a speaker box according to one embodiment of the present disclosure.

As shown in FIG. 1, the present disclosure provides a speaker box 100 including a housing 110, a speaker unit 120, and a sound-absorbing foam sheet 130. The housing 110 defines an accommodating space. The speaker unit 120 is accommodated in the accommodating space. The speaker unit 120 is enclosed with the housing 110 to define a rear cavity 140. The sound-absorbing foam sheet 130 is adhered to an inner wall of the rear cavity 140.

Figure 4:
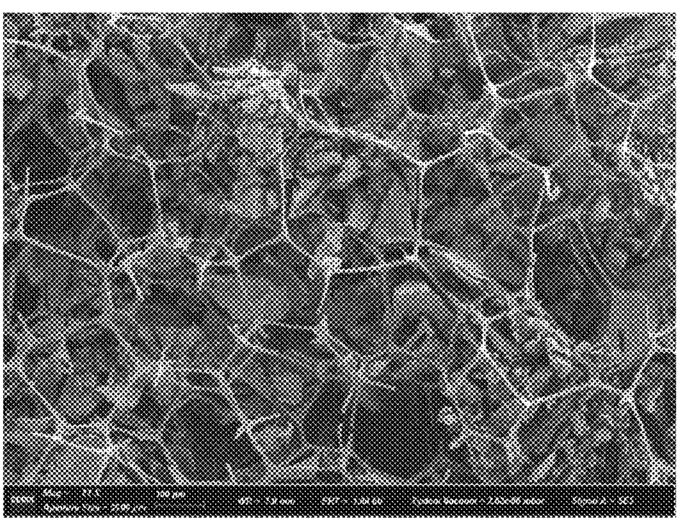
FIG. 4 is a schematic diagram of a surface of the sound-absorbing foam sheet observed by scanning electron microscopy (SEM) according to another embodiment of the present disclosure.

Specifically, as shown in FIG. 1, the speaker unit 120 is accommodated in the housing 110. The speaker unit 120 is enclosed with an inner wall of part of the housing 110 to define the rear cavity 140. The sound-absorbing foam sheet 130 is adhered to an inner bottom wall of the rear cavity 140. A thickness of the sound-absorbing foam sheet 130 depends on a thickness of the rear cavity 140, and a gap is defined between an upper surface of the sound-absorbing foam sheet 130 and an inner top wall of the rear cavity 140. In one optional embodiment, a thickness of the gap between the upper surface of the sound-absorbing foam sheet 130 and the inner top wall of the rear cavity 140 is set in a range of 0.05-0.3 mm. When the upper surface of the sound-absorbing foam sheet 130 is observed through scanning electron microscopy (SEM) and a scanning electron microscope, and an observation result is shown in FIG. 4.

Figure 2:
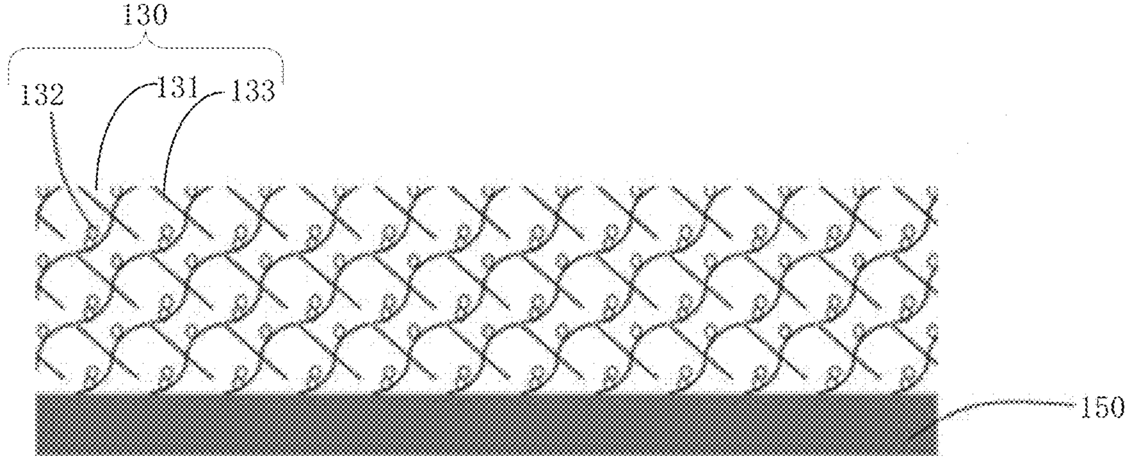
FIG. 2 is a cross-sectional schematic diagram of a sound-absorbing foam sheet connected to an adhesive component according to another embodiment of the present disclosure.
Figure 3:
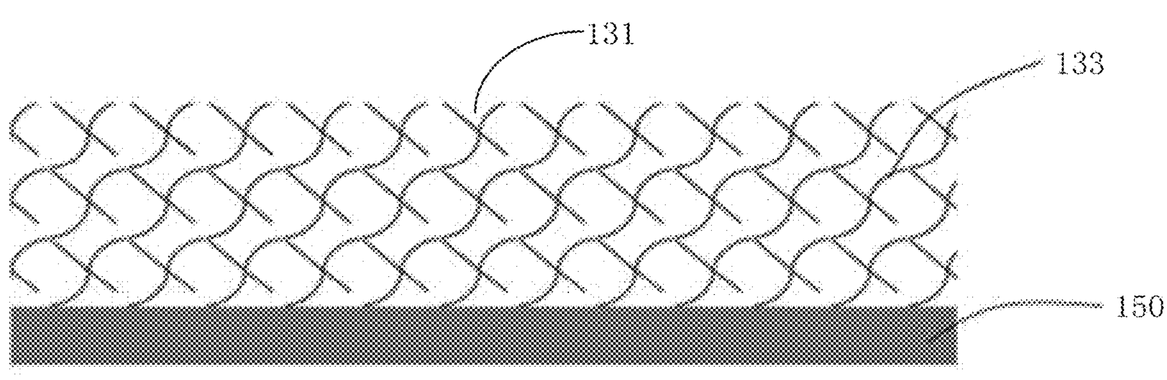
FIG. 3 is a cross-sectional schematic diagram of a foam block connected to the adhesive component according to another embodiment of the present disclosure.

It should be noted that, as shown in FIGS. 1-3, the sound-absorbing foam sheet 130 includes a foam block 131 and sound-absorbing powders 132 adhered in the foam block 131.

According to the speaker box provided by the embodiment of the present disclosure, the sound-absorbing foam sheet is adhered to the inner wall of the rear cavity, thus effectively reducing resonant frequency, and improving acoustic performance. The sound-absorbing powders are adhered in the foam block, thus improving performance stability of the speaker box during working, and preventing problems of falling off the sound-absorbing powders and breakage of the sound-absorbing block caused by collision between the sound-absorbing block and the inner wall of the rear cavity in the related art.

In one optional embodiment, as shown in FIGS. 1-3, under a condition that the sound-absorbing foam sheet 130 includes the foam block 131 and the sound-absorbing powders 132 adhered in the foam block 131. The foam block 131 is adhered to the inner wall of the rear cavity 140 through an adhesive component 150.

Specifically, as shown in FIGS. 1-3, the sound-absorbing powders 132 are adhered in the foam block 131, a bottom of the foam block 131 is directly adhered to a first side of a double-sided adhesive tape along a thickness direction of the double-sided adhesive tape, and a second side of the double-sided adhesive tape is directly adhered to the inner bottom wall of the rear cavity 140 along the thickness direction of the double-sided adhesive tape. Alternatively, the adhesive component is an object with a bonding effect except the double-sided adhesive tape, such as, glue and the like, and as long as enabling the foam block being bonded with the rear cavity, which is not limited thereto. In one optional embodiment, a thickness of the double-sided adhesive tape ranges from 0.02-0.2 mm, a density of the foam block 131 ranges from 10-100 mg/cm$^3$, and a thickness of the foam block 131 ranges from 0.2-5 mm. By setting a range of the thickness of the double-sided adhesive tape and a range of the thickness of the foam block, a minimum sum of the thickness of the double-sided adhesive tape and the thickness of the foam block reaches 0.22 mm, which is suitable for an ultrathin speaker cavity.

It should be noted that in an application process, the double-sided adhesive tape with the proper thickness and the foam block 131 with the proper thickness need to be selected according to the thickness of the rear cavity 140. When the thickness of the rear cavity 140 is determined, the thicker the foam block 131 is, the thinner the double-sided adhesive tape is, the more the sound-absorbing powders 132 are adhered in the foam block, the better the performances are. However, if the double-sided adhesive tape is too thin, the sound-absorbing powders 132 are easy to fall off.

According to the speaker box provided by the embodiment of the present disclosure, the sound-absorbing powders are adhered in the foam block, and the foam block adhered with the sound-absorbing powders is adhered to the double-sided adhesive tape, thus effectively solving a problem that the double-sided adhesive tape cannot fix the sound-absorbing block materials. The double-sided adhesive tape is configured for reinforcement, thus further preventing the problems of falling off the sound-absorbing powders and breakage of the sound-absorbing block caused by collision between the sound-absorbing block and the inner wall of the rear cavity in the related art. The sound-absorbing foam sheet is adhered to the inner wall of the rear cavity, thus effectively reducing the resonant frequency, improving the acoustic performance, and further improving the performance stability of the speaker box during working.

Further, as shown in FIGS. 2-3, the foam block 131 is an open-cell foam and is hydrophilic, and cells of the foam block 131 are exposed in the rear cavity 140. In one optional embodiment, the foam block 131 is one of melamine foam or polyurethane foam. The foam block contains more than 90% of cells with an aperture less than 0.5 mm. By arrangement of the foam block, the resonant frequency is more effectively reduced, the acoustic performance is improved, the sound-absorbing powders are better adhered, the sound-absorbing powders are prevented from falling off when the speaker box works, and the performance stability of the speaker box during working is improved.

In one optional embodiment, as shown in FIG. 2, the sound-absorbing powders 132 and adhesives are blended to from a water-based emulsion. The foam block 131 is impregnated with the water-based emulsion and dried, so that the sound-absorbing powders 132 are connected to a surface 133 of a support of the foam block 131.

Specifically, the water-based emulsion is formed by blending the sound-absorbing powders 132 and the adhesives, and the sound-absorbing powders 132 are agglomerated into blocks under an action of the adhesives. The foam block 131 is impregnated with the water-based emulsion, and the sound-absorbing powders 132 agglomerated into blocks and other sound-absorbing powders not agglomerated into blocks. are all coupled to the surface 133 of the support of the foam block 131 under the action of the adhesives, that is, a skeleton of the foam block 131. Then moisture is removed through freeze drying and a high-temperature drying process to obtain the sound-absorbing foam sheet 130 that is required, and the foam block 131 of the sound-absorbing foam sheet 130 is adhered to the sound-absorbing powders 132.

Furthermore, the adhesives are one or more of polyacrylate, styrene-butadiene emulsion, polystyrene acrylate, polystyrene acetate, polyurethane resin, and polyethylene vinyl acetate salt. The sound-absorbing powders 132 are zeolite materials having one or more of an MFI structure, an MEL structure, and an FER structure of which a Si/M ratio is greater than 100 and a particle size is less than 10 μm. The M includes one or more of Al, Fe, B, and Ga.

According to the speaker box provided by the embodiment of the present disclosure, the sound-absorbing powders are effectively adhered in the foam block through the water-based emulsion formed by blending, and the foam block with the sound-absorbing powders adhered to the double-sided adhesive tape solves the problem that the double-sided adhesive tape cannot fix the sound-absorbing block. Furthermore, the sound-absorbing foam sheet is adhered to the inner wall of the rear cavity, thus improving the performance stability of the speaker box during working, and preventing the problems of falling off the sound-absorbing powders and breakage of the sound-absorbing block caused by collision between the sound-absorbing block and the inner wall of the rear cavity in the related art.

A second aspect of the present disclosure provides the electronic device including the speaker box as previously described. Specific structure of the speaker box has been described in details and is not further elaborated herein.

According to the electronic device provided by the embodiment of the present disclosure, the sound-absorbing foam sheet is adhered to the inner wall of the rear cavity of the speaker box, thus effectively reducing resonant frequency, and improving acoustic performance. The sound-absorbing powders are adhered in the foam block, and the foam block with the sound-absorbing powders are adhered to the double-sided adhesive tape, thus solving the problem that the double-sided adhesive tape cannot fix the sound-absorbing block materials. Meanwhile, the sound-absorbing foam sheet is adhered to the inner wall of the rear cavity, thus improving the performance stability of the speaker box during working, and preventing the problems of falling off the sound-absorbing powders and breakage of the sound-absorbing block agglomerated by sound-absorbing powders caused by collision between the sound-absorbing block and the inner wall of the rear cavity in the related art.

It is understood that the above embodiments are merely exemplary embodiments configured to illustrate principles of the embodiments of the present disclosure, but the embodiments of the present disclosure are not limited thereto. For the person of ordinary skill in the art, various modifications and improvements can made without departing from spirit and essence of the embodiments of the present disclosure, and these variations and improvements are further considered to be within a protection scope of the embodiments of the present disclosure.

What is claimed is:

1. A speaker box, comprising:

a housing;

a speaker unit; and a sound-absorbing foam sheet;

wherein the housing defines an accommodating space, the speaker unit is accommodated in the accommodating space, the speaker unit is enclosed with the housing to define a rear cavity, and the sound-absorbing foam sheet is adhered to an inner wall of the rear cavity, and the sound-absorbing foam sheet comprises a foam block and sound-absorbing powders adhered in the foam block, the foam block is an open-cell foam, and cells of the foam block are exposed in the rear cavity, the foam block has a skeleton formed therein, the sound-absorbing powders are adhered on a surface of the skeleton.

2. The speaker box according to claim 1, wherein the foam block is adhered to the inner wall of the rear cavity through an adhesive component.

3. The speaker box according to claim 2, wherein the adhesive component is a double-sided adhesive tape, and a thickness of the double-sided adhesive tape ranges from 0.02-0.2 mm.

4. The speaker box according to claim 1, wherein a density of the foam block ranges from 10-100 mg/$cm^3$, and/or, a thickness of the foam block ranges from 0.2-5 mm.

5. The speaker box according to claim 1, wherein the foam block is selected from one of melamine foam and polyurethane foam, and the foam block contains more than 90% of cells with an aperture less than 0.5 mm.

6. The speaker box according to claim 1, wherein the sound-absorbing powders and adhesives are blended to form a water-based emulsion, and the foam block is impregnated with the water-based emulsion and dried, so that the sound-absorbing powders are connected to the surface of the skeleton.

7. The speaker box according to claim 6, wherein the adhesives are one or more of polyacrylate, styrene-butadiene emulsion, polystyrene acrylate, polystyrene acetate, polyurethane resin, and polyethylene vinyl acetate salt.

8. The speaker box according to claim 1, wherein the sound-absorbing powders are zeolite materials having one or more of an MFI structure, an MEL structure, and an FER structure of which a Si/M ratio is greater than 100 and a particle size is less than 10 μm, and the M comprises one or more of Al, Fe, B, and Ga.

9. An electronic device, comprising the speaker box according to claim 1.

* * * * *